United States Patent
Schröder et al.

(10) Patent No.: US 7,020,330 B2
(45) Date of Patent: Mar. 28, 2006

(54) AUTOMATIC CONTENT-ANALYSIS BASED USE OF COLOR CORRECTION PROCESS

(75) Inventors: Michael Schröder, Zürich (CH); Stefan Moser, Frick (CH)

(73) Assignee: Imaging Solutions AG, Regensdorf (CH)

( * ) Notice: Subject to any disclaimer, the term of this patent is extended or adjusted under 35 U.S.C. 154(b) by 514 days.

(21) Appl. No.: 10/115,104

(22) Filed: Apr. 4, 2002

(65) Prior Publication Data

US 2002/0196973 A1   Dec. 26, 2002

(30) Foreign Application Priority Data

Apr. 5, 2001   (EP) .................................. 01108591

(51) Int. Cl.
*G06K 9/00*   (2006.01)

(52) U.S. Cl. ..................... 382/167; 382/165; 382/190; 382/173; 358/538; 358/453

(58) Field of Classification Search ................ 382/164, 382/165, 167, 254, 274, 190, 198, 173, 176, 382/180, 305, 168; 358/538, 453
See application file for complete search history.

(56) References Cited

U.S. PATENT DOCUMENTS

| 5,870,491 | A | 2/1999 | Kawai et al. | |
| 6,377,702 | B1* | 4/2002 | Cooper | 382/167 |
| 6,473,535 | B1* | 10/2002 | Takaoka | 382/274 |
| 2001/0053247 | A1* | 12/2001 | Sowinski et al. | 382/162 |
| 2002/0080379 | A1* | 6/2002 | Iwaki | 358/1.13 |
| 2002/0105662 | A1* | 8/2002 | Patton et al. | 358/1.9 |
| 2003/0016865 | A1* | 1/2003 | Lopez et al. | 382/165 |
| 2003/0082490 | A1* | 5/2003 | Arcus et al. | 430/442 |

FOREIGN PATENT DOCUMENTS

| EP | 1005224 A2 | 5/2000 |
| EP | 1087614 A2 | 3/2001 |
| WO | WO97/01151 | 1/1997 |

* cited by examiner

*Primary Examiner*—Kanjibhai Patel
*Assistant Examiner*—Ali Bayat
(74) *Attorney, Agent, or Firm*—Buchanan Ingersoll pc

(57) ABSTRACT

The present invention is directed to a method for color correction for images, in particular for digital still camera images, including the following steps: an image is analyzed with respect to particular features assigned to a variety of image classes, each class having particular characteristics; the analysis based on a comparison of the image data of said image with a data base including data for assigning said image to a particular image class; said particular image class is associated with at least one color correction process adapted to implement color correction for the assigned image class.

9 Claims, 4 Drawing Sheets

AUTOMATIC CONTENT-ANALYSIS BASED USE OF COLOR CORRECTION PROCESS

This application claims priority under 35 U.S.C. §§ 119 and/or 365 to 01 108 591.7 filed in Europe on Apr. 5, 2002; the entire content of which is hereby incorporated by reference.

BACKGROUND OF THE INVENTION

1. Field of the Invention

The present invention is directed to a method for colour correction for images.

2. Description of the Background Art

In the prior art, many attempts have concentrated on the correction of digital colour data belonging to images of any kind. In particular, scanned negative or positive films have been transformed to digital data and have been directed to several different processes or methods to correct the colours of these image colour data. In addition, many pictures taken by consumers by means of digital still cameras also suffer from colour deviations which can also be based on the application of particular colour corrections accomplished by the software of the cameras themselves. It is known that photofinishing laboratories printing photos on the basis of the digital image data taken by still cameras have to manually correct the colours of up to 50% of the images before printing out these images. Otherwise, the colour quality of these prints would not be deemed to be sufficient by the customer. Accordingly, the cost of printing out in particular images taken by digital still cameras incurs considerably higher costs because the colour correction has to be accomplished manually.

Many colour correction algorithms are available. However, each of these colour correction algorithms or processes only provides satisfactory results for a very limited range of images. Furthermore, the known colour correction processes are based on the assumption that calibrated systems are used to take the photographs, whereas, digital still cameras, however, already implement an automatic correction or adaptation of the colour data of an image. Thus, since typical digital still cameras already transform colour image data into a particular colour space in the processor of the digital still camera, the known colour correction processes are not able to work with colour image data recorded by typical digital still cameras.

As outlined above, each of the usual colour correction processes is only applicable with acceptable results to certain types of images with certain features. On the other hand, the same colour correction processes render bad results for other types of images having other characteristics. Therefore, it is not possible to use the known colour correction processes for all types of images. Furthermore, as far as manual colour correction is concerned, it is not possible to implement this without the interaction of an educated and experienced, and thus very expensive operator.

SUMMARY OF THE INVENTION

Accordingly, it is an object of the present invention to develop a method for colour correction for images, and in particular for digital still camera images, which can resolve out the shortcomings of the known prior art and in particular of the above-described prior art. In particular, it is an object of the present invention to provide a new method able to implement a colour correction for a variety of different types or kinds of images, without the interaction of an operator.

The advantages of the present invention are based on a method which is, however, particularly useful for images taken by digital still cameras, and in general includes the following steps: An image is analysed with respect to particular features assigned to a variety of image classes, each class having particular characteristics; then an analysis being based on a comparison of the image data of said image with a data base including data to assign said image to a particular image class is carried out; and said particular image class is associated with at least one colour correction process which is adapted to implement a colour correction for the assigned image class, and thus for said image which has been identified as belonging to that particular class. Since many simple but effective colour correction algorithms or processes are specialized to particular colour defects and cannot deal with other colour defects, it has been necessary to employ the help of an experienced photofinishing operator to correct defective images taken by digital still cameras. This has been time consuming, and also therefore involved high costs. In accordance with the invention, it is not possible to automatically decide which colour correction process is promising with respect to which image, since it is possible to identify whether this image includes particular semantic or generic features, or other features to identify a particular images as belonging to a particular image class, which can be corrected by one or several simple but specialized and very effective colour correction algorithms.

Therefore, in accordance with the present invention it is possible to automatically decide by means of a hierarchical scheme which image has to be processed by means of which colour correction algorithm or process. Therefore, well known colour correction algorithms like white patch, grey world or retinex, and other well known colour correction processes, can be automatically directed to photographic images and in particular to the digital data of images taken by digital still cameras.

In other words, the present invention is directed to a method for colour correction which uses a hierarchical scheme. According to this scheme, an image is first analysed with respect to particular features. If one or more of these features are determined to be present in the image, it is determined whether the particular image belongs to a certain image class, said class always including at least one or more of the features identified as being present in the particular image. Then, one or more of the colour correction processes assigned to the one or more image classes to which the particular image belongs can be applied to the particular image to correct the colours of the image.

Of course, once the particular image class and thus the particular one or more colour correction processes have been determined, it is possible to choose one of a number of colour correction processes deemed to be useful for the selected image class. It is also possible to apply a number of the colour correction processes in a particular sequence to correct the colours of the particular image.

The decision as to which of the selected colour correction processes will work with the colour data of the particular image to be corrected can depend on probabilities or parameters. For example, if it is very likely that a particular colour correction algorithm can be applied to a particular image and another colour correction algorithm or process has a very small probability of being applicable, it might be advisable to first use the colour correction process with the smallest probability with small parameters to impose small corrections, and afterwards to apply the colour correction process with the large likelihood and with large correction parameters, resulting in large alterations of the colours. This is deemed to be useful since the colour situation is not greatly changed by the colour correction algorithm with the large probability and large alteration parameters if the selected colour correction process with the small probability and the small alteration parameters, and therefore the small alteration results, is applied first. However, this situation may be completely different for particular images in particular situations.

Of course, it is also advantageous to apply the colour correction process which is most likely for a particular image belonging to a particular selected image class. In some instances, it might be sensible to direct a further image class analysis to the already processed image data of said particular image to determine whether the image class has been changed during processing and whether it is then reasonable to direct a further, possibly different colour correction algorithm or process to the same image, to deal with other colour defects, after a further image class analysis.

A further variation of the method of the present invention involves a probability threshold which is used to select one or more colour correction algorithms or processes from a variety of colour correction processes deemed to be useful for a particular image.

According to a further useful variation of the present invention, further image information can be taken into account to pre-process the digital data of an image or to adapt the one or more selected colour correction processes. Accordingly, it is possible to read additional data from the memory of a digital still camera, such as the day, time, the type of camera, the type of correction and recording algorithms used in that particular digital still camera, whether a flash was used, and so on, to obtain additional information on how to correct the colours.

It is a very important further aspect of the invention to apply a Bayesian data analysis, and accordingly the Bayesian inference, to the hierarchical scheme of this invention. With respect to this aspect, reference is made to: D. Sivia. Data Analysis—A Bayesian Tutorial. Clarendon Press, Oxford, 1996, which reference is incorporated into the present disclosure.

On the basis of the Bayesian inference, it is additionally or alternatively possible to combine any kind of colour correction process, whether it is currently known or not, in order to achieve an acceptable colour correction.

According to a further aspect of the present invention, images which cannot be identified as belonging to a particular image class can be directed to the attention of an operator, or it is possible to store the image data of such images to be processed in a batch for later, so that it is usually possible to proceed automatically in a time and cost saving manner. Only if images are deemed not to be colour correctable by means of any of the available colour correction processes, are the image data of these uncorrectable images stored, to be transmitted to an operator for colour correction, or are directly transmitted to the operator for colour correction.

As outlined above, the present invention is also directed to a physical data carrier which carries the control data and/or the data base with the features of the different image classes. It is possible to read the control data and the data base from this physical data carrier in order to be able to operate a computer or a printer with a computer in accordance with the method according to the present invention.

In addition, the invention is also directed to an electromagnetic carrier wave which supports the control data and/or the data base for operating a computer or a printer with a computer in accordance with the method as set forth above.

Figure 1:
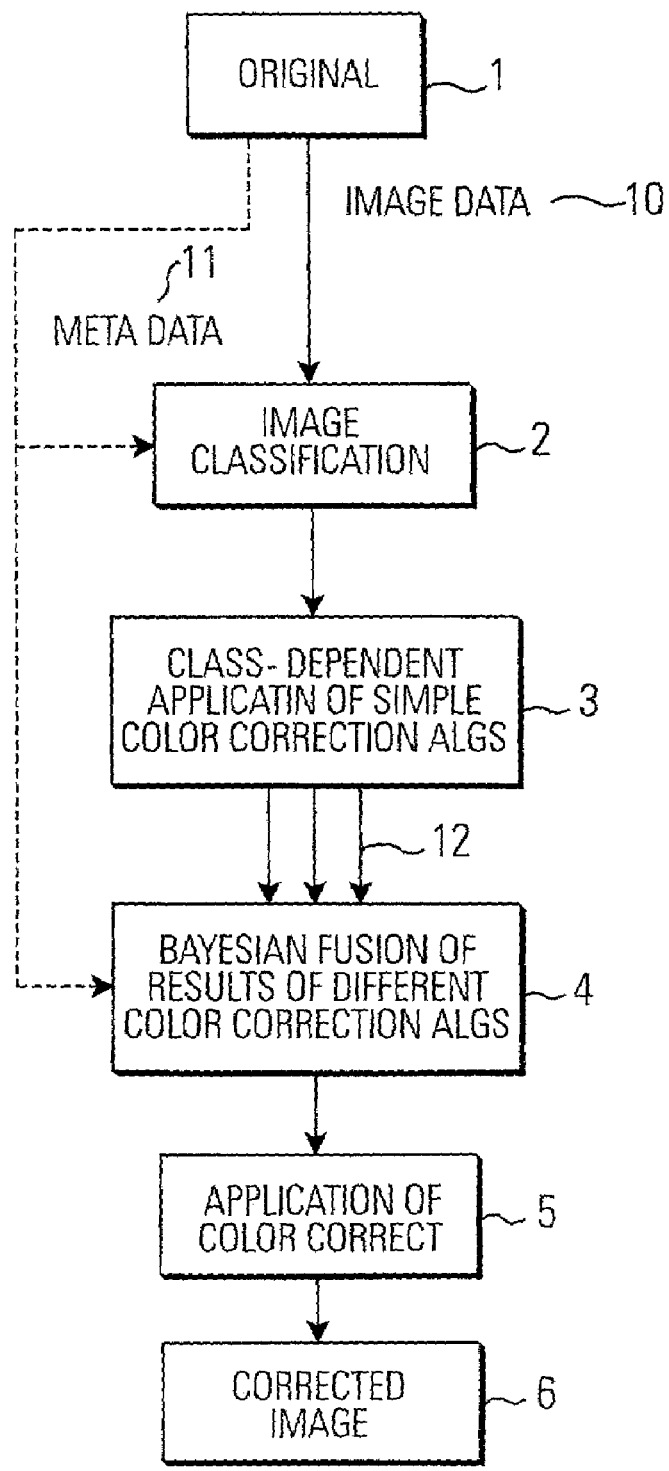
FIG. 1 is a rough block diagram of a method with features of the invention.

In the following, an advantageous embodiment with features of the invention will be described. Several variations are also disclosed. The embodiment discussed below is clarified with reference to the drawings.

First, the invention will be described in general without reference to the accompanying Figures.

In accordance with the invention, it is possible to use the known principals of content-based image retrieval (CBIR; for a recent overview of the research, see A. Smeulders, M. Worring, S. Santini, A. Gupta, and R. Jain. Content-based image retrieval at the end of the early years. IEEE PAMI, 22(12): 1349–1380, December 2000, the content of which is included in this application by reference). Accordingly, a large database of images can be accessed by content, in most cases by providing an example image and receiving feedback from the subsequent search results.

In order to answer content-based "query-by-example" queries, a generic signal-oriented content index has to be set-up and compared with the user examples. It is possible to simply describe the images using low-level features such as colour, texture, and shape resulting in a large low-level feature vector, which can be used to calculate similarities. However, these straightforward approaches were not able to demonstrate the ability to express content on a higher abstraction level.

In accordance with the invention, a more sophisticated hierarchical scheme can also be used. In a first aspect, it is possible to apply a hierarchical scheme that first determines a "codebook" or set of characteristic classes based on low-level features, for instance using self-organising maps or vector quantisation. These classes can then be linked to semantically meaningful labels.

Most of the simple colour correction algorithms (white patch/grayworld/retinex) perform well on some images and badly on others. Therefore, if it is possible to automatically detect the images which can be successfully treated, it will be possible to apply the simple algorithms in an optimum way: for each characteristic image class, the optimum parameters of each algorithm can be selected. It is possible to determine which algorithm or which combination of algorithms performs best.

In order to obtain the characteristic image classes, a modified version of the hierarchical scheme presented in M. Schröder, H. Rehrauer, K. Seidel, and M. Datcu "Interactive learning and probabilistic retrieval in remote sensing image archives", IEEE Trans. on Geoscience and Remote Sensing, 2000 (submitted for publication) is used. The disclosure of this reference is incorporated in the present application by reference. According to this modification, the image content description is performed in a hierarchical manner as depicted in Table 1, and in more detail in the scheme of FIG. 2. At first, local image features are extracted by means of various models 21 (e.g., colour, density, texture). Then, in a first classification step, the local features are classified into characteristic local classes 22 from which features in a block 23 can be calculated of the whole image (e.g., colour complexity, density complexity). Combined with additional prior knowledge from the metadata of the original image (e.g., camera model, exposure settings), the image can be classified into a characteristic image class 24.

The modification can also be commented on with reference to the following table 1:

TABLE 1

Hierarchical scheme of generic content description.

| Level | Explanation | Example |
|---|---|---|
| 5 | Semantic image class $A_v$ | class "white patch performs poorly" |
| 4 | Generic image class $\omega_i$ | class "high colour complexity" |
| 3 | Image feature | colour complexity |
| 2 | Pixel class | |
| 1 | Pixel feature | colour, texture |
| 0 | Image data $I_k$ | |

For a certain image $I_k$, of which automatic colour correction is applied, the probabilities $$P(\omega_i | I_k) \underline{\forall_i} \quad (1)$$

obtained, that is, the probabilities of the various image classes $\omega_i$ for a given image $I_k$.

Similarly, in a supervised scenario, $$p(A v | I_k). \quad (2)$$

If enough manual colour correction ground truth is available, a model can be set-up of how well a certain algorithm (e.g. "greyworld" with certain parameter settings) is able to reproduce it.

Mathematically, the class dependent model for colour correction can be expressed as $$p(\theta | \omega i, I_k), \quad (3)$$

wherein: A given image ($I_k$); a certain image class ($\omega i$); and a certain colour transformation ($\theta$), e.g., if we linearly scale each rgb channel, then we will have $\theta = (r_f, g_f, b_f)$.

Given a particular image $I_k$, we are interested in determining the probability distribution $P(\theta | I_k)$ of the colour transformation $\theta$. From this distribution, the transformation to be applied can be obtained by maximisation.

The probability distribution $p(\theta | I_k)$ can be expressed in terms of the image classes $\{\omega_i\}$ as $$p(\theta | I_k) = \sum_i p(\theta | \omega_i, I_k) \cdot p(\omega_i, | I_k), \quad (4)$$

where the sum over i extends over all image classes $\omega_i$. The individual factors of the elements of this sum are obtained as described above. In summary, the posterior image class probability $p(\omega_i, I_k)$ can be determined by the classification as outlined above. The distribution of colour correction transformation $p(\theta | \omega_i, I_k)$ can be derived from training data from manual colour corrections, as described in detail previously.

In summary, it is proposed to precede the application of the one or more simple colour correction algorithms by a step involving classification of the image into certain classes and subsequently applying colour correction algorithms or processes that have been optimised for the specific image class. These image classes can be either semantic classes (certain sujets, e.g., "indoor scene", vegetation scene", or "mountain scene") or signal-oriented, generic classes (e.g., "scene of high colour complexity"). After the class-specific application of a set of simple colour correction algorithms, the results of these algorithms are combined in such a way as to take into account the class-specific reliabilities of each algorithm or process. This can be done in a step involving Bayesian inference that also allows the taking into account of further available information (e.g. the camera model or meta data of the exposure). Altogether, this results in a hierarchical system of automatic colour correction that significantly reduces the number of consumer images requiring manual colour correction.

After a set of colour corrections has been selected, a Bayesian fusion of the results takes place. For a given class $\omega_i$, a set of automatic colour correction algorithms $\{V_j\}$ is applied, each of which provides a certain colour correction transformation $\theta_{vj}(I_k, \omega_i)$ (the notation $A|_B$ means "A for a given B"). Since for each algorithm/class combination the accuracy of the colour transformation (compared to humans determining the transformation "manually" via visual inspection) can be determined, it is possible to model the relationship between the actual colour transformation $\theta$ and the result of each automatic colour correction as a probability:

$$p(\underline{\theta_{Vj}(I_k, \omega_i)} \mid \underline{\theta}), \quad (5)$$
$$\text{result of algorithm} \quad \text{actual}$$

which is given as, for example a multivariate Gaussian. In this stage, it is the actual colour transformation which has to be determined.

In order to combine the results of several algorithms, the total probability of all results can be used, which is given as a product of the individual probabilities, if we assume the independence of individual algorithms. The prior distribution of the colour transformation reads as follows:

$$P(\theta | \omega_i, \text{meta data}) \quad (6)$$

On the basis thereof, the posterior distribution of the colour transformation reads as follows:

$$p(\theta | \omega i, I_k) \propto p(\theta | \omega_i, \text{meta data}) \cdot \prod_j p(\theta_{V3}(I_k, \omega_i) | \theta), \quad (7)$$

where the sum over j extends over all algorithms $V_j$ (the symbol $\propto$ denotes "proportional to"). Now, it is possible to obtain the final colour transformation (for this image class) by maximising Eq. (7). The prior $p(\theta | \omega_i, \text{meta data})$ is independent of the currently analysed image $I_k$ and models the expected colour corrections for the current image class $\omega_i$ and available meta data.

The invention is structured as follows. First the image analysis is conducted, providing a signal-oriented description of the content of the image. After the determination of the class-specific colour corrections, the different results are processed in a Bayesian framework, to provide a colour corrected image data file which can be printed out.

The hierarchical system of the invention can be applied to any devices in which automatic colour correction of consumer images, and particularly images taken by digital still cameras, is needed, such as digital photofinishing systems (e.g. all the digital systems of Gretag Imaging, Photo CD systems, and stand-alone or independent image enhanced tools.

The basic workflow according to a preferred example of the present invention will now be explained with reference to FIG. 1. First, the content of the image is analysed using methods of CBIR, as explained above. As a result, posterior probabilities $$p(\omega_i | I_k) \quad (8)$$

for image classes are obtained. In addition to the unsupervised signal-oriented classes $\omega_i$, it is the concept of this invention to also allow the use of supervised ("semantic") classes $A_v$, that might correspond to certain photographic sujets. Accordingly, the result is classification of $$p(A_v | I_k). \quad (9)$$

For the later Bayesian inference process, all $\omega_i$ simply have to be substituted by $A_v$.

After classification, a set of automatic colour correction algorithms is applied and the individual results are fused into one final result $p(\omega_i | I_k)$, as explained above.

Finally, the combined colour correction results for each class $p(\omega_i | I_k)$ are combined using the probabilities of each class $p(\omega_i | I_k)$ in order to obtain $p(\theta | I_k)$. This is the probability distribution of the colour correction for the image under investigation. The final colour correction is obtained by maximising this distribution, this final step not being mentioned in FIG. 1.

Furthermore, the basic workflow of the present invention first involves a classification 2, followed by a class-dependent application of colour correction algorithms 3, and then the Bayesian fusion of the results 4.

Figure 2:
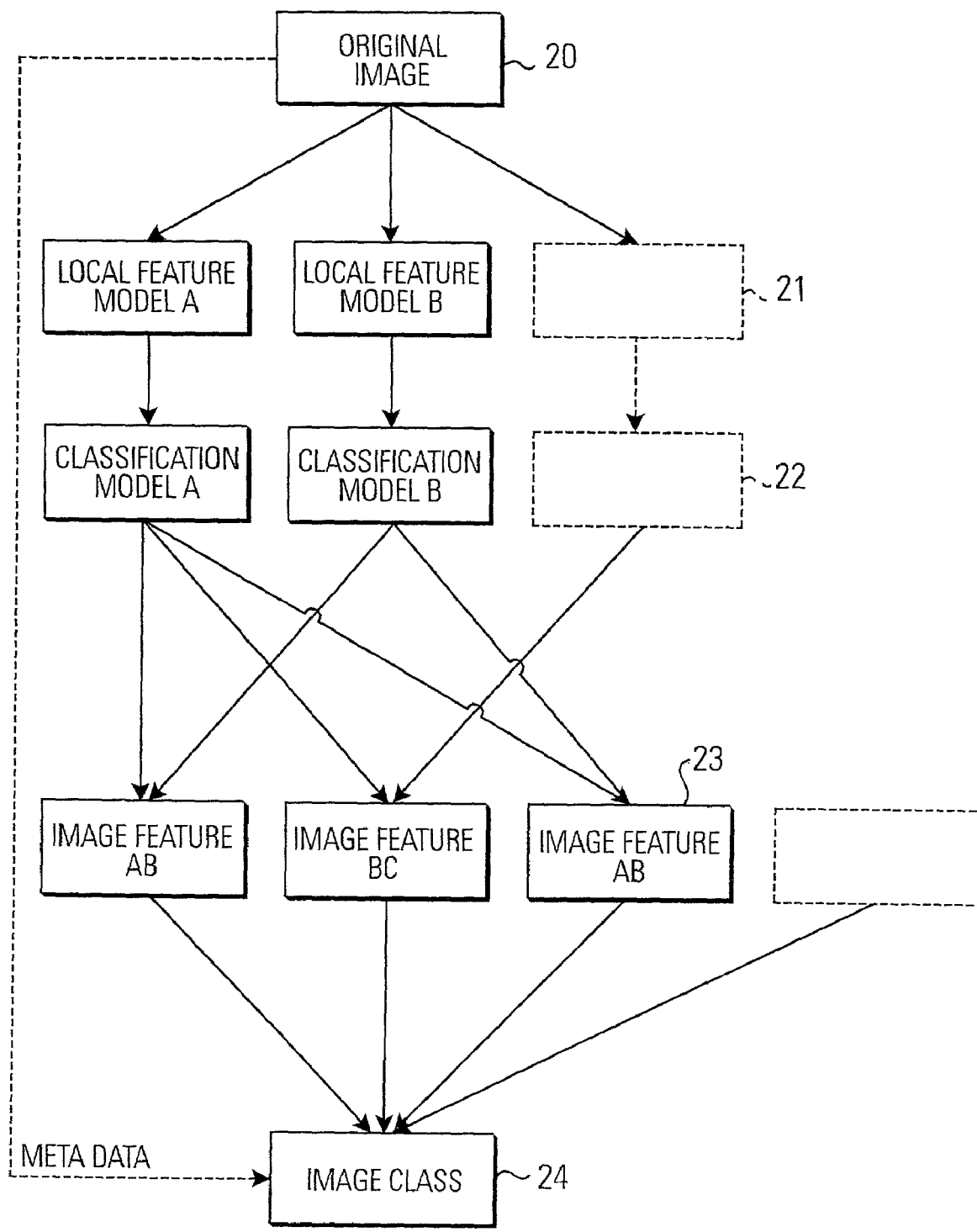
FIG. 2 is a variant or more detailed version of a part of the diagram of FIG. 1.
Figure 3:
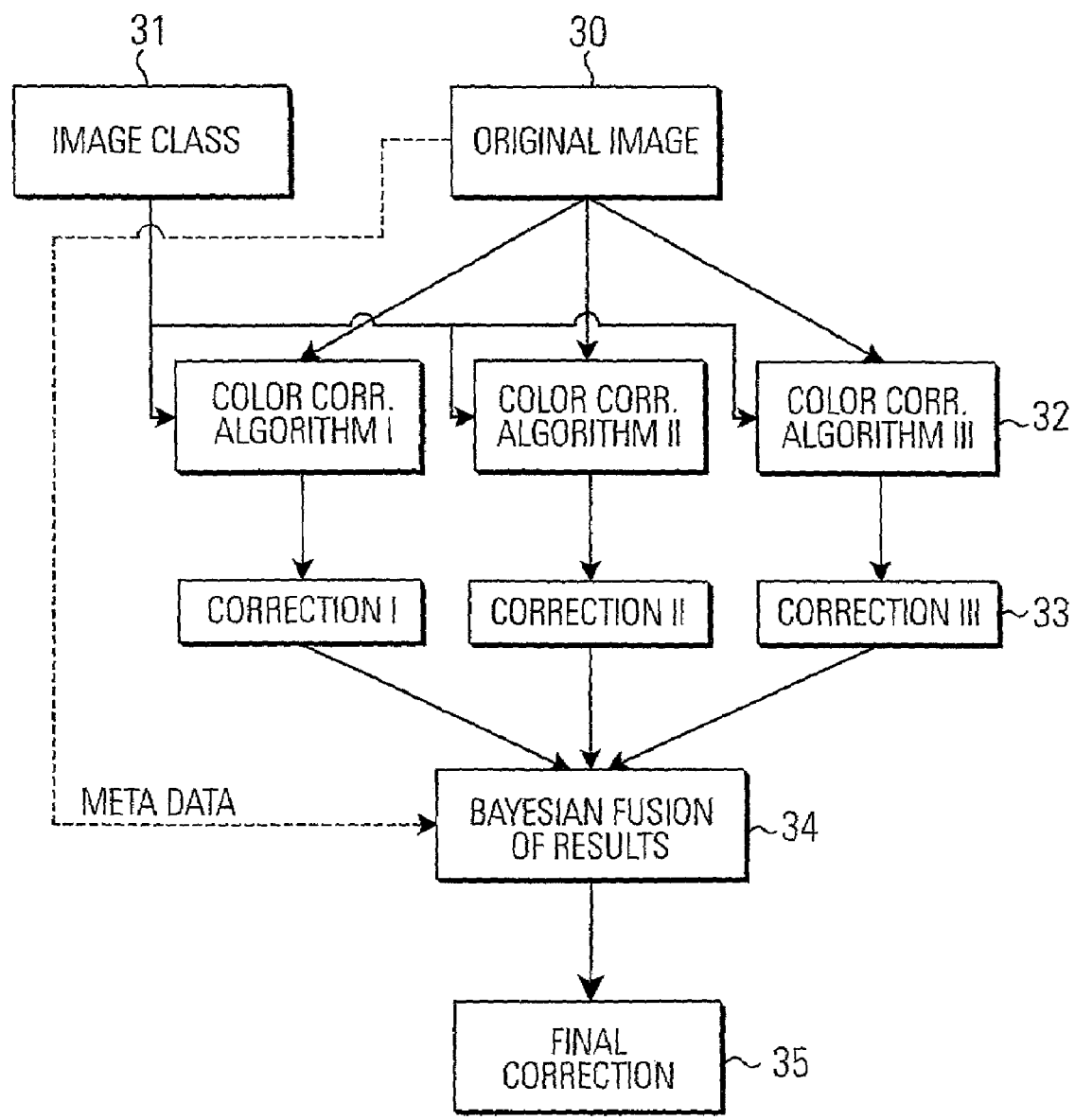
FIG. 3 is a more detailed representation of an image classification as a block diagram.

In addition, FIG. 2 shows the hierarchical image content description. First, the local image features are extracted using various models 21 (e.g., colour, density, texture). In a first classification step 22, the local features are classified into local classes of characteristics from which the features 23 of the whole image (e.g. colour complexity, density complexity) can be calculated. Combined with additional prior knowledge from the meta data of the original image (e.g. camera model, exposure settings) the image can be classified into a characteristic image class 24. In FIG. 3, a class dependent application of a set of colour correction algorithms 32 is followed by a Bayesian fusion 34 of the set of results 33. As a result, a final correction θ is obtained at the reference number 35. The number of colour correction algorithms is not limited to three.

Figure 4A:
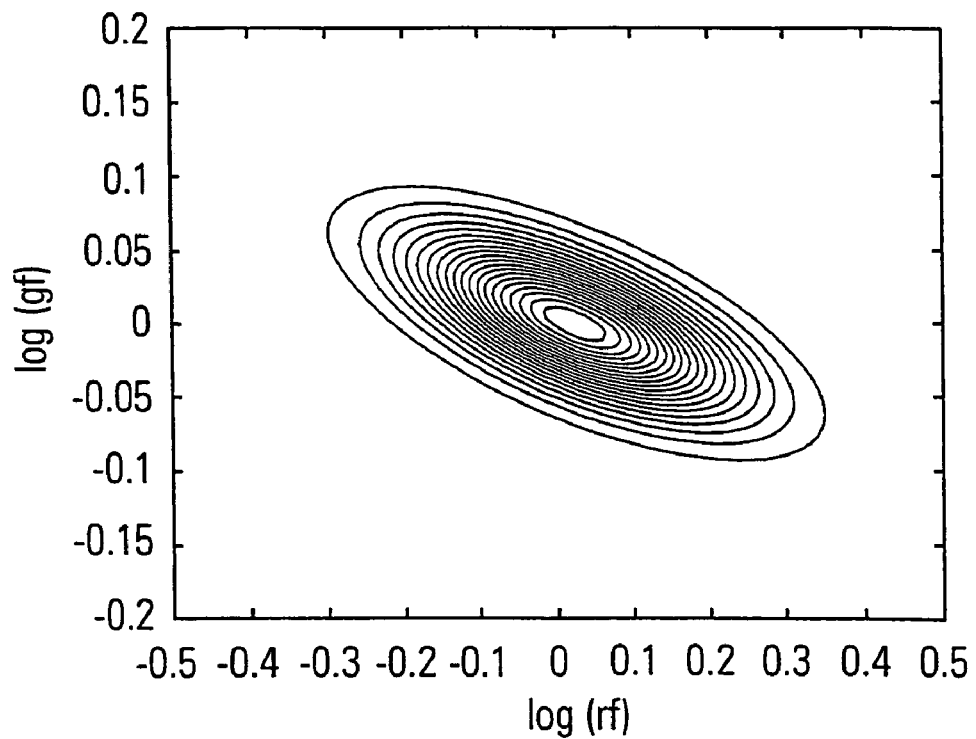
FIGS. 4A–4B are distributions for digital cameras in general (FIG. 4A) and for a particular camera (Kodak DC 210 Zoom) (FIG. 4B).
Figure 4B:
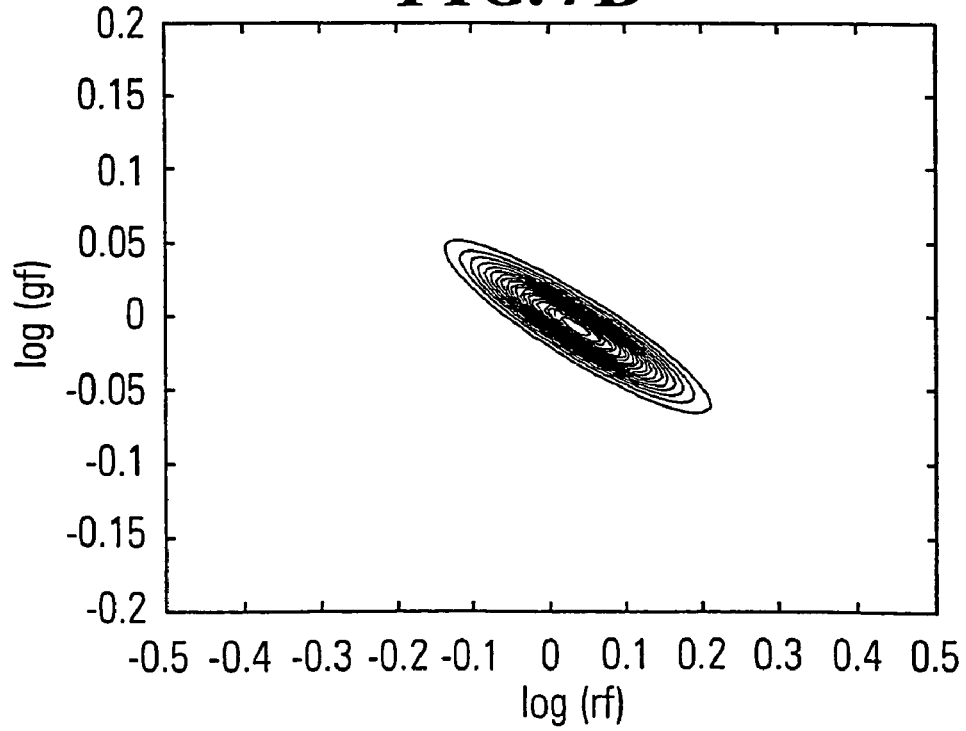

In FIG. 4, prior distributions $p(\log(r_f), \log(g_f))$ for digital cameras in general (top) and for one particular model (Kodak DC 210 Zoom, bottom) are depicted for comparison purposes. Accordingly, it can be seen that colour corrections for images taken with a digital still camera have to be adapted in accordance with the principles of the present invention.

What we claim is:

1. A method for colour correction for images, in particular for digital still camera images, including the following steps:
    a) an image is analysed with respect to particular features assigned to a variety of image classes, each class having particular characteristics;
    b) the analysis is based on the comparison of the image data of said image with a data base including data for assigning said image to a particular image class;
    c) said particular image class is associated with at least one colour correction process being adapted to implement colour correction for the assigned image class.

2. The method according to claim 1, wherein one or more probabilities likelihood's are determined that a particular image belongs to one or more classes.

3. The method according to claim 2, wherein the most likely class is selected and a colour correction process associated with said selected class is applied to said image or digital image data thereof.

4. The method according to claim 2, wherein if several classes are likely to belong to said image, the colour correction processes belonging to said classes are applied to said image, if the corresponding probabilities exceed a particular probability threshold.

5. The method according to claim 2, wherein one or more colour correction algorithms or processes are selected and/or combined according to the principals of a Bayesian inference.

6. The method according to claim 2, wherein the colour correction processes are applied either with increasing or with decreasing probabilities.

7. The method according to claim 1, wherein further imaging information, such as recording information of a specific camera, are taken into account.

8. The method according to claim 1, wherein one or more of the known colour correction processes are used to implement said colour correction or colour corrections in accordance with the assignment procedure corresponding to step 1b) and/or 1c).

9. The method according to claim 1, wherein images identified as not being colour correctable by means of any of the colour correction processes are transmitted to an operator for colour correction.

* * * * *